United States Patent [19]

DuBroff

[11] 4,367,542
[45] Jan. 4, 1983

[54] PHASE SHIFTING OF WAVEFORMS

[75] Inventor: Richard E. DuBroff, Bartlesville, Okla.

[73] Assignee: Phillips Petroleum Company, Bartlesville, Okla.

[21] Appl. No.: 246,542

[22] Filed: Mar. 23, 1981

[51] Int. Cl.³ .............................................. G01V 1/00
[52] U.S. Cl. ..................... 367/48; 455/139; 455/209; 367/128; 343/100 SA; 329/122
[58] Field of Search ..................... 367/21, 46, 48, 123, 367/125, 190; 181/108, 112, 122; 455/42, 139, 205, 207, 209, 260, 276; 337/43; 329/122; 343/113

[56] References Cited

U.S. PATENT DOCUMENTS

| | | | |
|---|---|---|---|
| 2,661,464 | 12/1953 | Wolf | 340/15 |
| 2,923,367 | 2/1960 | Cox | 181/0.5 |
| 3,039,094 | 6/1962 | Anderson | 343/113 |
| 3,140,490 | 7/1964 | Sichak et al. | 343/100 |
| 3,163,844 | 12/1964 | Martin | 367/135 |
| 3,252,541 | 5/1966 | Broding | 181/0.5 |
| 3,292,177 | 12/1966 | Brightman et al. | 343/113 |
| 3,342,283 | 9/1967 | Pound | 181/0.5 |
| 3,344,881 | 10/1967 | White | 181/0.5 |
| 3,348,152 | 10/1967 | Laughlin, Jr. et al. | 455/139 |
| 3,356,989 | 12/1967 | Autrey | 367/135 |
| 3,472,334 | 10/1969 | Snodgrass | 181/0.5 |
| 3,529,282 | 9/1970 | Brown et al. | 340/15.5 |
| 3,597,727 | 8/1971 | Judson et al. | 340/15.5 |
| 3,638,176 | 1/1972 | White | 340/15.5 MC |
| 3,689,873 | 9/1972 | Weller | 340/15.5 TD |
| 3,761,874 | 9/1973 | Landrum, Jr. | 367/190 |
| 3,873,958 | 3/1975 | Whitehouse | 367/135 |
| 3,889,229 | 6/1975 | Kostelnicek et al. | 367/48 |
| 4,170,766 | 10/1979 | Pridham et al. | 367/135 |
| 4,176,354 | 11/1979 | Hsiao et al. | 343/17.7 |

OTHER PUBLICATIONS

Andrew C. Dibble, Jr., "Phase Shift Array, Arbitrary and Continuous Through 360°", NASA Tech. Briefs, Fall 1978.

George D. Doland, "Control of Small Phased-Array Antennas", NASA Tech. Briefs, Summer 1978.

Milton H. Aronson, "Low-Level Measurements-8 Lock-in and Carrier Amplifiers", Measurements and Data Corp. 1977.

*Primary Examiner*—Maynard R. Wilbur
*Assistant Examiner*—Bruce Harris

[57] ABSTRACT

A signal having the form $\cos(\Omega t + \phi)$ where $\Omega$ is the frequency of the signal and $\phi$ is a phase angle which may be zero is phase shifted to improve the results of the summation of such a signal with other signals having the same form but different phase angles.

4 Claims, 7 Drawing Figures

PHASE SHIFTING OF WAVEFORMS

This invention relates to method and apparatus for phase shifting a waveform. In one aspect this invention relates to method and apparatus for applying different phase shifts to a plurality of waveforms to improve the summation of the plurality of waveforms. In another aspect this invention relates to method and apparatus for utilizing phase shifting of a waveform to enhance data received at a plurality of receivers or transmitted from a plurality of sources.

The drawings will be utilized to provide background information concerning the present invention and also to provide a detailed description of the present invention. A brief description of the drawings is as follows.

Figure 1:
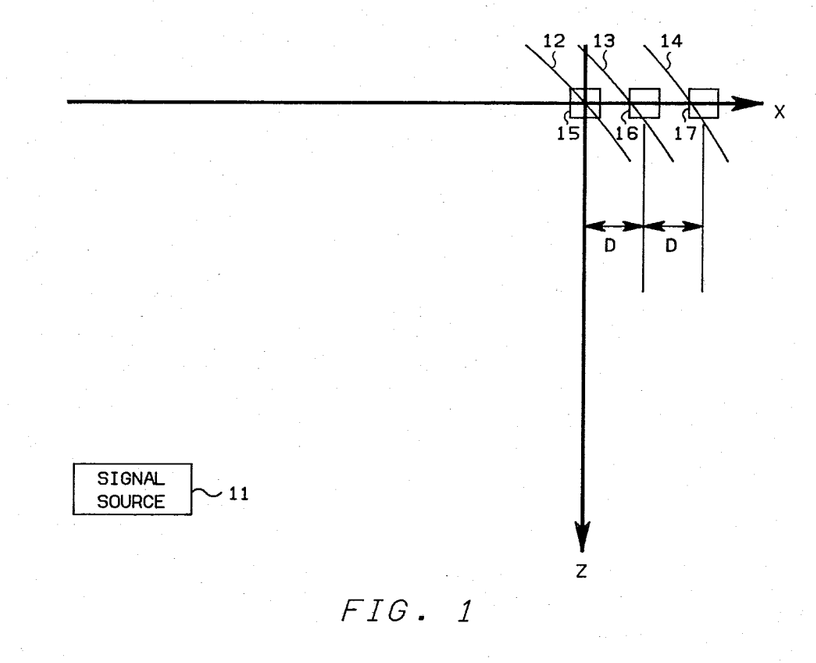
FIG. 1 is a general representation of the propagation of wavefronts from a signal source to a plurality of receivers.

Referring now to FIG. 1, there is illustrated a signal source 11. This signal source 11 could be a transmitter or could be an object or configuration of objects capable of reflecting signals such as seismic signals or radar signals. Wavefronts are then created as a natural consequence of the action of signal source 11.

Three wavefronts 12-14 are illustrated in FIG. 1, but it should be understood that: (a) with the passage of time, the wavefronts 12-14 will recede away from the signal source 11; (b) each wavefront shown in FIG. 1 represents a small segment of the actual wavefront which will generally be continuous and similar in form to the ripple created by dropping a stone into water.

The wavefronts 12-14 are received by a plurality of receivers 15-17, the receivers being separated by a distance increment of D along the X direction. For the sake of simplicity, the receivers 15-17 have been illustrated as having identical elevations (Z-coordinates).

The classical plane wave is described by the form:

$$\cos [\Omega t - k_x X - k_z Z] \quad (1)$$

where
 $\Omega$ = frequency of the wave;
 t = time;
 k = wavenumber;
 $k_x$ = horizontal wavenumber component;
 $k_z$ = vertical wavenumber component; and
 (X,Z) = positional coordinate with reference to some origin.

A wavefront which is said to be associated with waves of the form of Equation (1) consists of those combinations of X,Z, and t for which the argument of Equation (1)—that is, $\Omega t - k_x X - k_z Z$, is constant with different constants corresponding directly to different wavefronts.

When the separation increment, D, becomes sufficiently small in comparison to the distance separation between the signal source 11 and the receivers 15-17, the wavefronts which are incident upon the plurality of receivers may, for practical purposes, be regarded as being the wavefronts for a classical plane wave of the form of Equation (1). For the receivers illustrated in FIG. 1, Z is equal to 0 and Equation (1) reduces to $$\cos [\Omega t - k_x X] \quad (2)$$

Assuming that receiver 15 is in the reference X position such that X equals 0 for receiver 15, the wavefront 12 seen by the receiver 15 will have the form $$\cos \Omega t \quad (3)$$

At the same time, the wavefront 13 seen by receiver 16 will have the form $$\cos [\Omega t - k_x D] \quad (4)$$

and the wavefront 14 seen by receiver 17 will have the form $$\cos [\Omega t - 2k_x D] \quad (5)$$

As can be seen from Equations (3), (4) and (5), the wavefront 13 will be out of phase with the wavefront 12 by $k_x D$ and in like manner the wavefront 14 will be out of phase with the wavefront 13 by $k_x D$.

Figure 2:
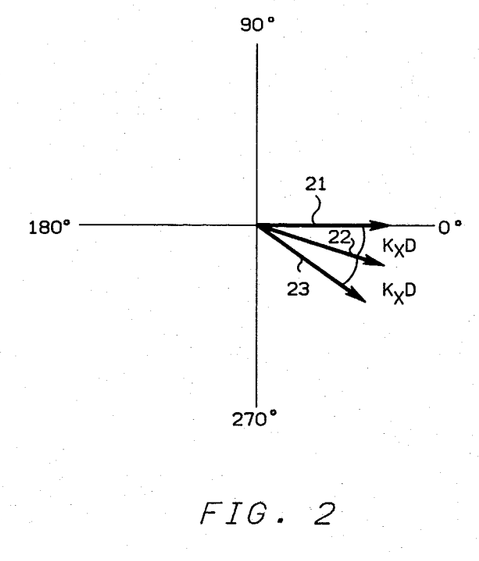
FIG. 2 is a phasor illustration of the signals which would be provided from the receivers 15-17 illustrated in FIG. 1.

A phasor illustration of the signals which would be provided from the receivers 15-17 is illustrated in FIG. 2. Phasor 21 is representative of the output from receiver 15. In like manner, phasors 22 and 23 are representative of the output from receivers 16 and 17, respectively. It is assumed that all of the output signals have the same magnitude but, as illustrated in FIG. 2, the output signals would have different phases which are illustrated as angles in the phasor representation of FIG. 2.

Figure 3:
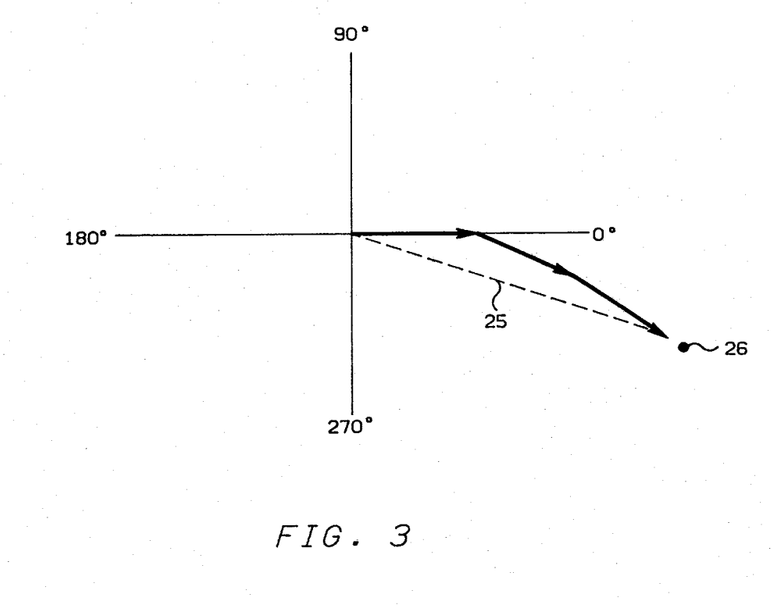
FIG. 3 is a phasor summation of the output signals illustrated in FIG. 2.

A plurality of receivers are often utilized in communications, radar, and seismic exploration to monitor waves. The output from the various receivers are summed to provide an enhanced signal. This is particularly advantageous when the received signals are weak. A phasor summation of the output signals from the receivers 15-17, which are illustrated in FIG. 2, is illustrated in FIG. 3. It can be seen that the resultant phasor 25 has a much larger magnitude than any one of the phasors 21, 22 and 23. However, if a phase offset of $-2k_x D$ were applied to the output of receiver 15 and a phase offset of $-k_x D$ were applied to the output of receiver 16, then the resultant phasor provided by the summation of the output of receivers 15, 16 and 17 would extend to point 26 illustrated in FIG. 3. The summation of the output of the receivers would have a greater magnitude and would be enhanced with respect to the summation of the receivers output without applying a phase shift.

It is thus an object of this invention to provide method and apparatus for applying different phase shifts to a plurality of waveforms to maximize the summation of the plurality of waveforms. It is another object of this invention to provide method and apparatus for utilizing phase shifting of a waveform to enhance data received at a plurality of receivers or transmitted from a plurality of sources.

The background for the present invention has been described in terms of a plurality of receivers all of which are receiving the same wavefront. It is, however, noted that the background for the present invention could have been described in terms of a plurality of transmitters each of which are transmitting to the same receiver but each of which are separated by some geographical distance. The same principles could apply and a phase shifting of the transmitted signals could enhance the output signal at the receiver.

In accordance with the present invention, method and apparatus is provided for phase shifting a first signal which has the form $$\cos[\Omega t - k_x X - k_z Z] \tag{1}$$

In general, this may be accomplished by generating a second signal which has the form $$\cos[\omega t + \phi] \tag{6}$$

where $\omega$ is the frequency of the second signal; and $\phi$ is the desired phase shift. The first signal may be mixed with the second signal with the resulting signal being mixed with a signal having the form of Equation (6) without the phase shift $\phi$ to produce a signal one term of which has the form $$\cos[\Omega t - k_x X - k_z Z + \phi] \tag{7}$$

which is the desired result.

Other objects and advantages of the invention will be apparent from the foregoing brief description of the invention and the claims as well as the detailed description of FIGS. 4–7.

Figure 4:
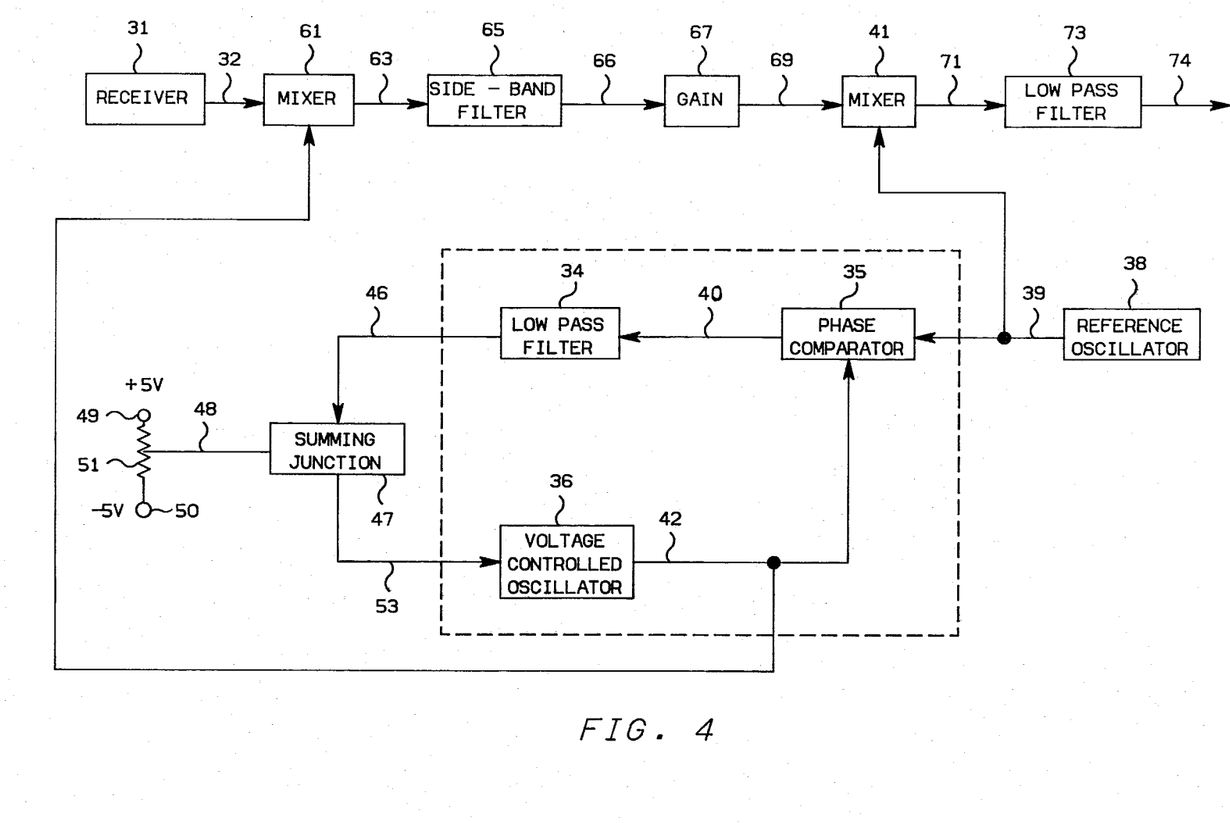
FIG. 4 is an illustration of a circuit which may be utilized to phase shift a signal.

Referring now to FIG. 4, there is illustrated a receiver 31 which provides an output signal 32 having the form of Equation (1). For the sake of simplicity in the following description, it will be assumed that X and Z are both 0 and thus signal 32 will be assumed to have the form of Equation (3). It will further be assumed that it is desired to add a phase shift to signal 32 so that signal 32, after processing, will be in phase with a signal having the form of $$\cos(\Omega t + \phi). \tag{8}$$

The low pass filter 34, phase comparator 35 and voltage control oscillator 36 are all well known components of a phase lock loop. The theory of operation of a phase lock loop is well known and will not be gone into in detail except to the extent necessary to facilitate an understanding of the operation of the circuit illustrated in FIG. 4. In general, the reference oscillator 38 provides an output signal 39 which has the form cos $\omega t$ where $\omega$ is as defined in Equation (6). The frequency $\omega$ is preferably much greater than the frequency $\Omega$ so that required filtering may be easily accomplished. Signal 39 is provided as an input to the mixer 41 and the phase comparator 35. In a standard phase lock loop configuration, the output signal 40, from the phase comparator 35, would be provided directly through the low pass filter 34 to the voltage controlled oscillator 36. The output signal 42 from the voltage controlled oscillator 36 would be provided to the phase comparator 35. Since signal 40 is proportional to the phase difference between signals 39 and 42, the output signal 42 from the voltage controlled oscillator would be forced to lock on the frequency of signal 39 and, at steady-state, the frequency of signal 42 would be equal to $\omega$ and would have the form cos $\omega t$, together with some phase shift.

In the present invention, the output signal 40 from the phase comparator 35 is passed through the low pass filter 34 and is provided as signal 46 to the summing junction 47 which may be an operational amplifier or other suitable device. The summing junction 47 is also provided with a DC voltage signal 48 from the combination of the +5 volt power supply 49, the −5 volt power supply 50 and the potentiometer 51. Signal 48 is summed with signal 46 to provide signal 53 to the input of the voltage controlled oscillator 36. The addition of signal 48 to signal 46 forces the output signal 42 from the voltage controlled oscillator to assume the form of Equation (6). Signal 42 is provided as an input to the mixer 61 as is signal 32. The mixer 61 multiplies signals 32 and 42 to establish an output signal 63 which has the form $$\tfrac{1}{2}\{\cos[(\omega+\Omega)t+\phi]+\cos[(\omega-\Omega)t+\phi]\} \tag{9}$$

Signal 63 is provided to the side band filter 65 which is utilized to filter the second term in Equation (9) in such a manner that the output signal 66 from the side band filter 65 has the form $$\tfrac{1}{2}\{\cos[(\omega+\Omega)t+\phi]\}. \tag{10}$$

Signal 66 is provided to the gain block 67 which may be utilized to amplify signal 66 by any desired factor. If the gain provided by the gain block 67 is represented as G, then the output signal 69 will have the form $$G/2\{\cos[(\omega+\Omega)t+\phi]\} \tag{11}$$

Signal 69 is provided to the mixer 41 and is multiplied by signal 39 to establish signal 71 which will have the form $$G/4\{\cos[\Omega t+\phi]+\cos[(2\omega+\Omega)t+\phi]\} \tag{12}$$

Signal 71 is passed through the low pass filter 73 to remove the high frequency term and establish signal 74 which will have the form of $$G/4\{\cos[\Omega t+\phi]\} \tag{13}$$

which is the desired result.

The circuitry illustrated in FIG. 4 may also be utilized to subtract a phase shift $\phi$ from signal 32 so that signal 32 will be in phase with the signal having the form of $$\cos(\Omega t-\phi). \tag{14}$$

This may be accomplished by using the sideband filter 65 to filter the first term of Equation (9) instead of the second term.

If it is assumed that the output signal 32 from the receiver 31 has the form of Equations (13) or (14), the circuitry illustrated in FIG. 4 may be utilized to add a phase shift $\phi$ to or subtract a phase shift $\phi$ from signal 32 so that signal 74 will be in phase with a signal having the zero phase shift of the signal of Equation (3).

The circuitry illustrated in FIG. 4 has been described in terms of blocks which are familiar to those involved in signal processing. Specific designs and examples of the blocks illustrated in FIG. 4 may be found in a number of references. Two specific references are: Terman, Frederick Emmons, *Radio Engineer's Handbook,* McGraw-Hill Book Company, Inc., 1943 and ITT, *Reference Data for Radio Engineers,* 5th Edition, Howard V. Sams and Co., Inc., 1969. Also, phase lock loops and the operation thereof are described very completely in the Applications Book published by Signetics Corp. (1974).

Figure 5:
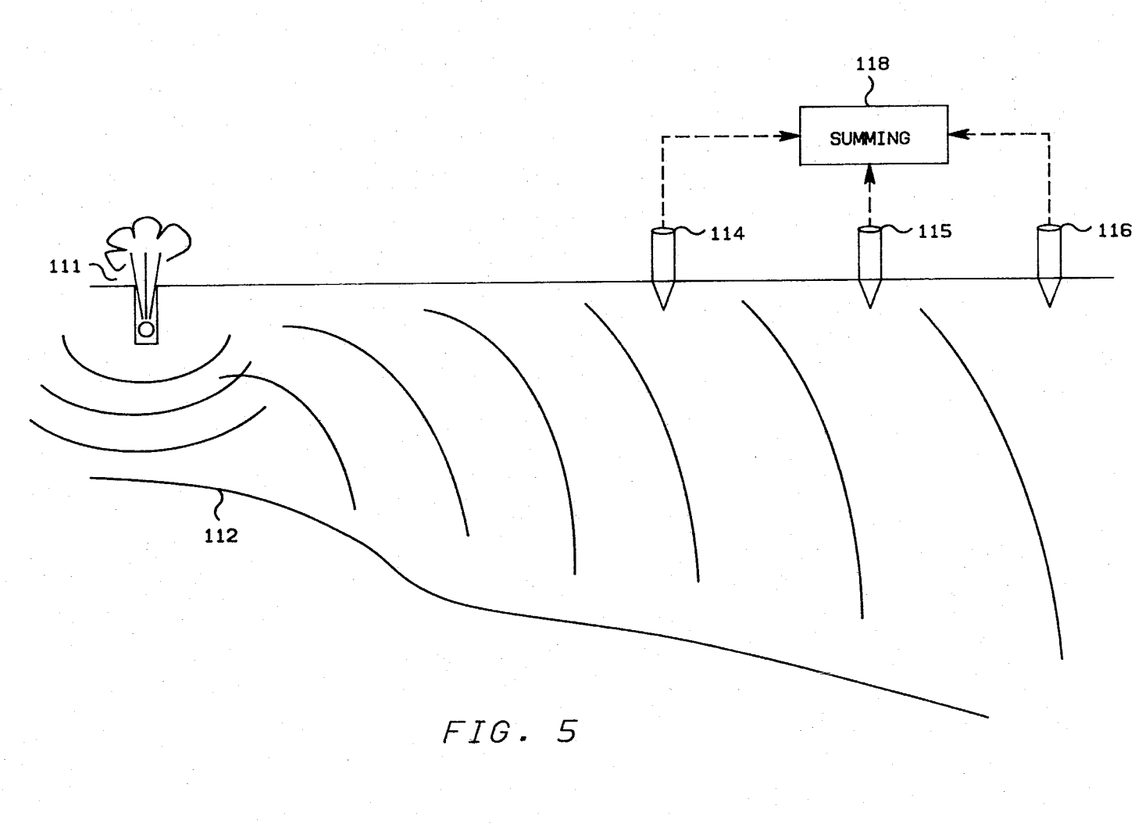
FIG. 5 is a general representation of a typical seismic exploration scene.

The present invention is particularly applicable to seismic exploration and the following discussion of a specific embodiment of the present invention is in the field of seismic exploration. Referring now to FIG. 5, there is illustrated a typical seismic exploration scene in which an explosive charge 111 is set off which generates wavefronts that travel through the earth and are reflected from the reflecting strata 112 in such a manner that the reflected energy is received by the geophones 114–116. The geophones 114–116 are analogous to the receivers 15–17 illustrated in FIG. 1. Typically, the signals detected by each of the geophones 114–116 at any instant in time will be out of phase and summing of the output signals from the geophones 114–116 in the summing block 118 will provide the result illustrated in FIG. 3 for any fixed frequency component. For the sake of illustration, it will be assumed that the output signals from geophones 114–116 will have the form of Equations (3)–(5) respectively and it will further be assumed that $k_xD=\phi$.

The circuitry illustrated in FIG. 4 could be utilized in conjunction with each of the geophones illustrated in FIG. 5 in such a manner that the processed output signals from the geophones 114–116 would be in phase. As an example, the phase shift angle associated with geophone 115 would be $\phi$ and the phase shift angle associated with geophone 116 would be $2\phi$. The phase shift angles associated with the geophones would be independently controlled.

The use of independently controlled phase shift angles is acceptable but it is sometimes difficult to apply the correct phase shift to each geophone individually. However, enhanced results may still be obtained by utilizing the phase shift techniques of the present invention to apply a linear phase taper to the outputs from geophones 114–116. Stated more precisely, if each geophone in an array is designated as having a phase of $\phi_k$ where k ranges from 1 for geophone number 1 to n for the last geophone in an array, then the equation $$\phi_k = (k-1)\Delta \qquad (15)$$

describes a linear phase taper of $\Delta$ radians per geophone array element.

Figure 6:
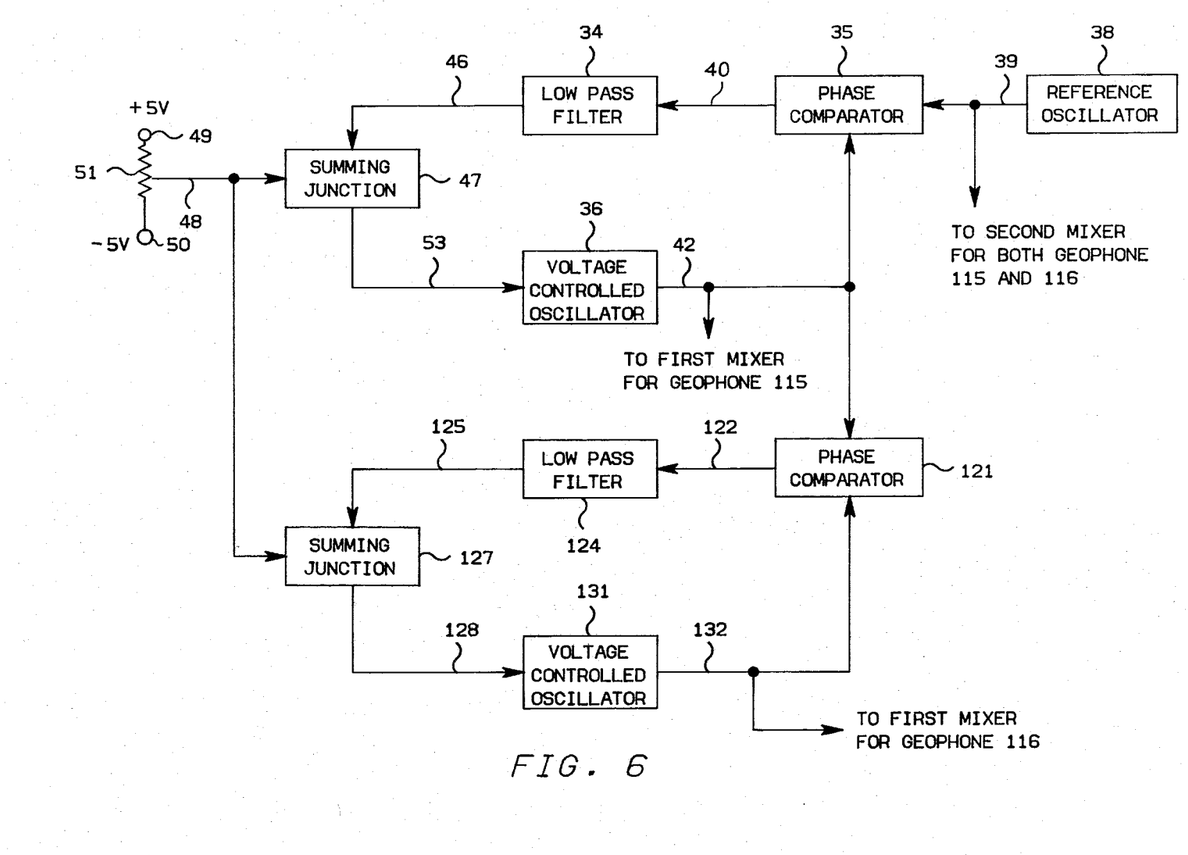
FIG. 6 is a diagrammatic representation of a circuit which may be utilized to apply a linear phase taper to a plurality of signals.

FIG. 6 illustrates a signal processing technique which utilizes the present invention for adding a phase shift to a signal in order to apply a linear phase taper to the outputs from geophones 114–116. For the sake of simplicity, the outputs from geophones 114–116 have been assumed to have the form previously stated so that exact cancellation of the $k_xD$ phase shifts between input signals of adjacent geophones may be illustrated. Although many times the phase shifts between input signals of adjacent geophones will not be equal, the circuitry of FIG. 6 can still be utilized to enhance the result of summing the outputs from a plurality of geophones as will be described more fully hereinafter.

Referring now to FIG. 6, the illustrated elements operate in the same manner as previously described for FIG. 4. For the sake of convenience, the geophones have not been illustrated and also it should be recognized that each geophone output will have two mixers, a sideband filter, a gain and a low pass filter associated therewith as is illustrated in FIG. 4 in connection with the receiver 31. Mixer 61 will be referred to hereinafter as the first mixer while mixer 41 will be referred to as the second mixer.

The elements illustrated in FIG. 6, which have the same numbers as elements illustrated in FIG. 4, operate in the same manner as illustrated in FIG. 4 to provide signal 42 having the form $$\cos[\omega t + \phi] \qquad (16)$$

where $\phi$ is determined by signal 48.

For the sake of illustration it will be assumed that it is desired to apply a phase shift of $+\phi$ to the output of geophone 115 and a phase shift of $+2\phi$ to the output of geophone 116. Thus, signal 42 is provided to the first mixer for geophone 115 and the output of geophone 115 is processed as illustrated in FIG. 4 to yield an output signal having the form of Equation (3). It is noted that the output signal 39 from the reference oscillator 38 is not only provided to the second mixer for geophones 115, as before, but is also provided to the second mixer for geophone 114 and would be provided to all second mixers for any additional geophones.

The output signal 42 from the voltage controlled oscillator 36 is also provided as the reference voltage input to the phase comparator 121. The output signal 122 from the phase comparator 121 is passed through the low pass filter 124 and is provided as signal 125 to the summing junction 127. Signal 48 is also provided as an input to the summing junction 127. The summation of signals 125 and 48 is provided as signal 128 to the voltage controlled oscillator 131. The output signal 132 from the voltage controlled oscillator is provided as an input to the phase comparator 121 and is also provided as an input to the first mixer for geophone 116.

The phase comparator 121, low pass filter 124, summing junction 127 and voltage controlled oscillator 131 act in the same manner as previously described for similar elements in FIG. 4. However, because the reference signal provided to the phase comparator 121 will have the form of Equation (16), signal 132 will have the form of $$\cos(\omega t + 2\phi). \qquad (17)$$

When signal 132 is mixed with the output from geophone 116 the resulting output, when processed as illustrated in FIG. 4, will have the form of Equation (3). It can thus be seen that the processed outputs from geophones 114, 115 and 116 will be aligned in phase through the use of a linear phase taper provided by a single setting of signal 48. It is thus not necessary to set a phase shift for each geophone individually to provide an improved summation.

Figure 7:
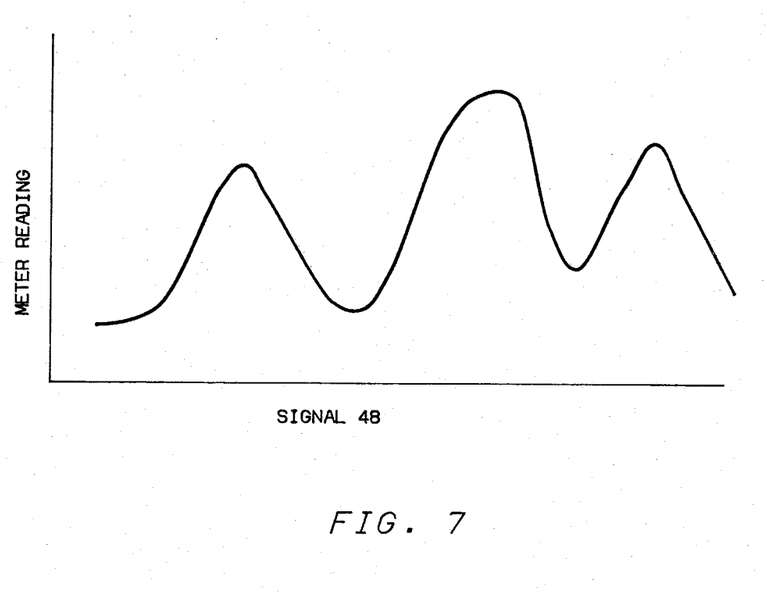
FIG. 7 is a representation of a result which may be obtained by using the circuit illustrated in FIG. 6.

As has been previously stated, the circuitry illustrated in FIG. 6 may be utilized to provide improved summations from a plurality of geophones without the necessity of knowing the particular phase shift required for each geophone and without the necessity of applying the exact phase shift required by each geophone. This may be accomplished simply by varying signal 48 while monitoring the result of the summation of the output signals from the various geophones. A variation in signal 48 provides a variation in the linear phase taper. This is particularly advantageous when a continuous waveform, such as would be provided by Vibroseis ®, is being detected by the geophones. A result which might occur is illustrated in FIG. 7. A meter reading which is representative of the summation of the processed outputs of a plurality of geophones is plotted as a function of the magnitude of signal 48. It can be seen as different phase shifts are applied that three maxima occur. This would be indicative that there are three reflective boundaries or boundary segments. If there were only one reflective boundary, as illustrated in FIG. 5, then only one maxima would generally occur as the value of signal 48 is changed. In this manner, it is possible to obtain a maximum summation of the output of a plurality of geophones without knowing the particular phase shift which should be applied to the output of each individual geophone.

It is also noted that a sampling technique may be utilized if desired. A sampling technique would be particularly advantageous where an explosive charge is being utilized to produce the seismic energy detected by the geophones. The magnitude of signal 48 would be changed to different settings such that, during the time period in which energy is being received from a single explosive charge, a linear phase taper of, for example, 15° will be applied, then 30°, then 45°, then 60°, then 75° and then 90° with this sequence being repeated at a rate sufficiently high to satisfy the sampling theory requirements.

As an example, if the time period M is considered the sampling period then the following chronological sequence of events could occur. It is noted that a typical value of M would be on the order of $4 \times 10^{-3}$ seconds for seismic exploration. The sequence of events is as follows:

1. Time T=0: Signal 48 is set to lock in a phase shift of 30° between adjacent geophones.
2. Time T=0.01 M: Phase shifts have been locked in. The summation of the geophone outputs is recorded.
3. Time T=0.5 M: The magnitude of signal 48 is changed to lock in a phase shift of 60° between adjacent geophones.
4. Time T=0.51 M: The 60° phase shifts have been locked in. The summation of the output of the geophones is recorded.
5. Time T=M and Subsequent Times: Repeat steps 1 through 4.

Using the above steps, a plurality of linear phase tapers may be applied to the output of a plurality of geophones during a time in which the energy from a single explosive charge is being received. It is also noted that the sampling technique could be utilized if a continuous source such as Vibroseis ® were being utilized in the seismic exploration.

The invention has been described in terms of a preferred circuit for adding a phase shift to a signal having the form of Equation (1) as illustrated in FIG. 4 and in terms of a circuit for providing a linear phase taper between array elements as illustrated in FIG. 6.

Reasonable variations and modifications of the preferred circuitry illustrated in FIGS. 4 and 6 are possible by those skilled in the art and such variations and modifications are within the scope of the described invention and the appended claims. It is again emphasized that the present invention does not lie in any particular type of receiver or transmitter but rather lies in the method and apparatus for phase shifting a signal having the form of Equation (1) whether that signal is being transmitted or received and further lies in method and apparatus for providing a linear phase taper between a plurality of receivers or transmitters.

I claim:
1. Apparatus comprising:
   a first phase comparator having first and second inputs and an output;
   means for providing a reference signal having the form cos $\omega t$ to the first input of said phase comparator, wherein $\omega$ is the frequency of said reference signal;
   a first voltage controlled oscillator having an input and an output;
   means for providing an output signal from the output of said first voltage controlled oscillator to the second input of said first phase comparator, wherein said first phase comparator establishes a first signal which is proportional to the phase difference between said reference signal and said output signal from said first voltage controlled oscillator;
   means for combining a DC voltage with said first signal to produce a first combined signal;
   means for providing said first combined signal to the input of said first voltage controlled oscillator, wherein the output signal from said first voltage controlled oscillator has the form cos $(\omega t + \phi_2)$ and $\phi_2$ is a phase angle which is determined by said DC voltage;
   a first mixer having first and second inputs and an output;
   means for providing a second signal having the form cos $(\Omega t + \phi_1)$ wherein $\Omega$ is the frequency of said first signal, $\phi_1$ is a phase angle and $\Omega$ is less than $\omega$, to the first input of said first mixer;
   means for providing the output signal from said first voltage controlled oscillator to the second input of said first mixer, wherein said first mixer establishes a third signal which is representative of the result of mixing said second signal with said output signal from said first voltage controlled oscillator;
   a first side band filter;
   a second mixer having first and second inputs and an output;
   means for providing said third signal from the output of said first mixer through said first side band filter to the first input of said second mixer, wherein a side band of said third signal is removed by said first side band filter;
   means for providing said reference signal to the second input of said second mixer, wherein said second mixer establishes a fourth signal representative of the result of mixing the side band filtered third signal and said reference signal;
   a first low pass filter; and
   means for passing said fourth signal through said first low pass filter means to establish a fifth signal which has the form of a phase shifted said second signal.

2. Apparatus in accordance with claim 1 additionally comprising:
   a second phase comparator having first and second inputs and an output;
   means for providing the output signal from said first voltage controlled oscillator to the first input of said second phase comparator;

a second voltage controlled oscillator having an input and an output;

means for providing the output signal from the output of said second voltage controlled oscillator to the second input of said second phase comparator, wherein said second phase comparator establishes a sixth signal which is proportional to the phase difference between the output signal from said first voltage controlled oscillator and the output signal from said second voltage controlled oscillator;

means for combining said DC voltage with said sixth signal to produce a second combined signal;

means for providing said second combined signal to the input of said second voltage controlled oscillator, wherein the output signal from said second voltage controlled oscillator has the form $\cos(\omega t + 2\phi_2)$;

a third mixer having first and second inputs and an output;

means for providing a seventh signal, having the form $\cos(\Omega t + \phi_3)$ wherein $\phi_3$ is a phase angle to the first input of said third mixer;

means for providing the output signal from said second voltage controlled oscillator to the second input of said third mixer, wherein said third mixer establishes an eighth signal which is representative of the result of mixing said seventh signal and the output signal from said second voltage controlled oscillator;

a second side band filter;

a fourth mixer having first and second inputs and an output;

means for providing said eighth signal through said second side band filter to the first input of said fourth mixer;

means for providing said reference signal to the second input of said fourth mixer, wherein said fourth mixer establishes a ninth signal which is representative of the result of mixing the side band filtered eighth signal and said reference signal;

a second low pass filter;

means for passing said ninth signal from the output of said fourth mixer through said second low pass filter to thereby establish a tenth signal which has the form of a phase shifted said seventh signal, wherein the phase shift applied to said seventh signal is twice the phase shift applied to said second signal.

3. A method for phase shifting a first signal having the form $\cos(\Omega t + \phi_1)$ wherein $\Omega$ is the frequency of said first signal and $\phi_1$ is a phase angle, said method comprising the steps of:

establishing a reference signal having the form of $\cos \omega t$, wherein $\omega$ is the frequency of said reference signal and $\omega$ is greater than $\Omega$;

establishing a second signal having the form $\cos(\omega t + \phi_2)$, wherein $\phi_2$ is a phase angle;

mixing said first signal and said second signal to establish a third signal which is representative of the result of mixing said first signal and said second signal;

filtering a side band of said third signal to establish a fourth signal;

mixing said fourth signal and said reference signal to establish a fifth signal; and filtering the high frequency component of said fifth signal to establish a sixth signal which has the form of a phase shifted said first signal.

4. A method in accordance with claim 3 for phase shifting a seventh signal having the form $\cos(\Omega t + \phi_3)$, wherein $\phi_3$ is a phase angle, said method for phase shifting said seventh signal comprising the additional steps of:

establishing an eighth signal which has the form $\cos(\omega t + 2\phi_2)$;

mixing said seventh signal and said eighth signal to establish a ninth signal;

filtering a side band of said ninth signal to establish a tenth signal;

mixing said tenth signal and said reference signal to establish an eleventh signal; and filtering the high frequency component of said eleventh signal to establish a twelfth signal which has the form of a phase shifted said sixth signal, wherein the phase shift applied to said sixth signal is twice the phase shift applied to said first signal.

* * * * *